United States Patent [19]

Dietrich, Sr.

[11] Patent Number: 4,542,793
[45] Date of Patent: Sep. 24, 1985

[54] ONE-PASS COMPLETE TILLAGE SYSTEM

[75] Inventor: William J. Dietrich, Sr., Congerville, Ill.

[73] Assignee: DMI, Inc., Goodfield, Ill.

[21] Appl. No.: 531,169

[22] Filed: Sep. 9, 1983

Related U.S. Application Data

[60] Division of Ser. No. 220,419, Dec. 29, 1980, Pat. No. 4,403,662, which is a continuation-in-part of Ser. No. 934,585, Aug. 17, 1978, Pat. No. 4,245,706.

[51] Int. Cl.⁴ .............................................. A01B 35/18
[52] U.S. Cl. .................................... 172/180; 172/484; 172/468
[58] Field of Search ............... 172/140, 491, 307, 461, 172/458, 464, 468, 470, 471, 316, 484, 509, 482, 454, 784, 455, 785, 398, 180, 142, 178, 181, 509, 567, 569, 579, 578, 583, 595, 145–149, 174, 175

[56] References Cited

U.S. PATENT DOCUMENTS

| | | |
|---|---|---|
| 1,557,109 | 10/1925 | Vandeberg ........................... 172/603 |
| 1,674,779 | 6/1928 | Heitmeyer ............................ 172/140 |
| 1,944,275 | 1/1934 | Sandeen .............................. 172/574 |
| 2,066,610 | 1/1937 | Carlin . |
| 2,766,672 | 10/1955 | Zunk . |
| 3,126,689 | 3/1964 | Walker ............................ 172/491 X |
| 3,155,168 | 11/1964 | Telecky ............................... 172/484 |
| 3,225,839 | 12/1965 | Petitt .................................. 172/142 |
| 3,578,090 | 5/1971 | Cline .................................. 172/699 |
| 3,757,871 | 9/1973 | Maust ................................ 172/484 |
| 3,935,906 | 2/1976 | Neal . |
| 4,180,005 | 12/1979 | Zumbahlen .......................... 172/142 |
| 4,227,581 | 10/1980 | Klotzbach ........................... 172/142 |
| 4,313,503 | 2/1982 | Good .................................. 172/140 |

Primary Examiner—Richard J. Johnson
Attorney, Agent, or Firm—Emrich & Dithmar

[57] ABSTRACT

The system includes a pull-type frame with a forward line of disc blades widely spaced to part the trash, mix it with soil and displace most of the mixture laterally on top of previously undisturbed soil, thereby creating strips of ground which are alternately cleared and windrowed. At least a second line of disc blades, also widely spaced, is placed to the rear of the first line; and these blades are offset laterally from, and located in the windrows formed by, the discs of the first row, to part and return at least some of the previously cleared trash and previously undisturbed soil back onto the cleared strips while still leaving strips of undisturbed soil with an accumulation of cleared trash on top. Cooperating with the discs are novel plow points located in the undisturbed strips having accumulated layers of cleared trash. In one embodiment, strips of untilled soil are left only between the non-working surfaces of a pair of associated blades (one of the forward line and one of the rear), and in another case, strips are left between the working and the non-working surfaces of associated blades. Plow points are located to till all such strips.

10 Claims, 18 Drawing Figures

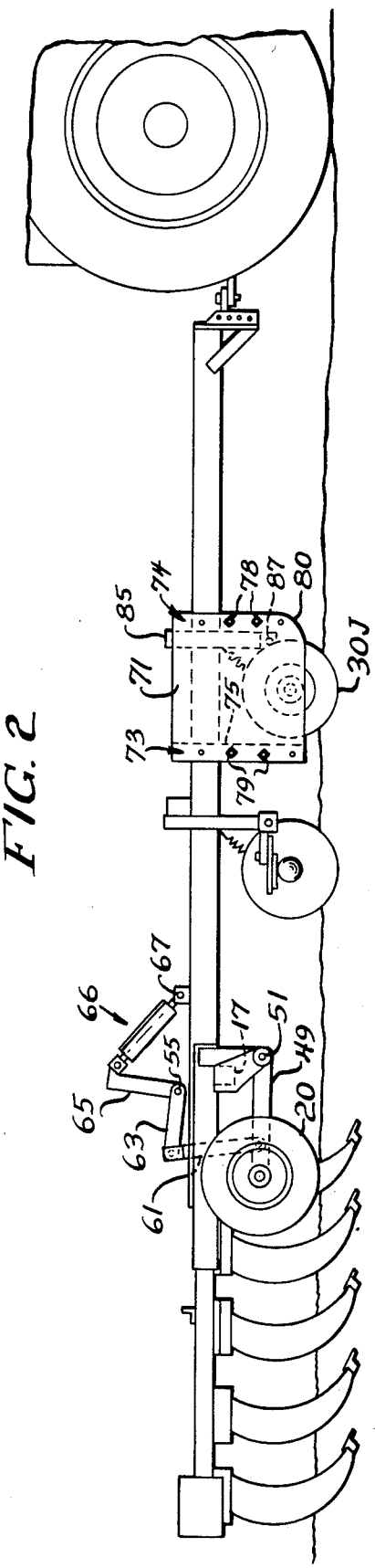
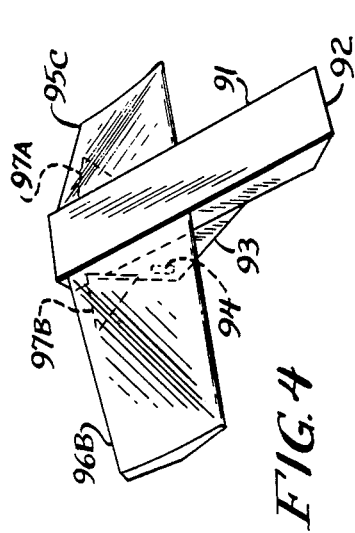
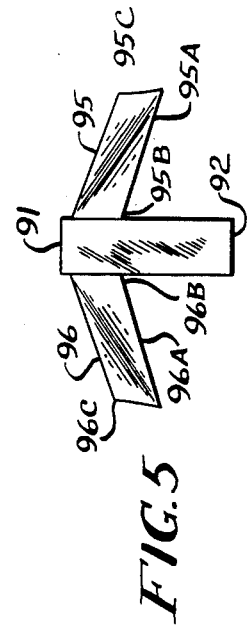
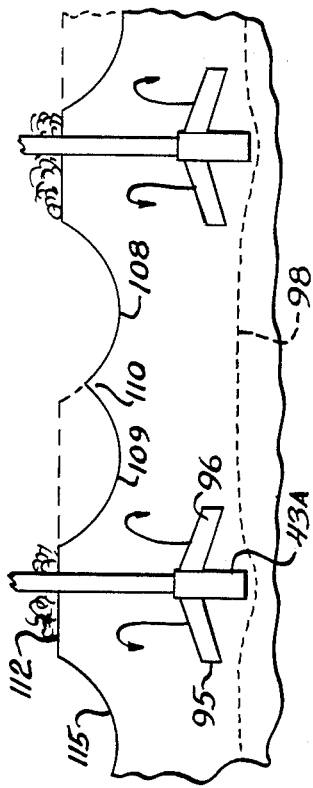
FIG. 2
FIG. 4
FIG. 5
FIG. 3

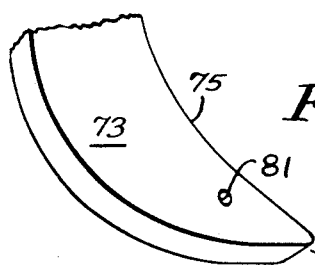
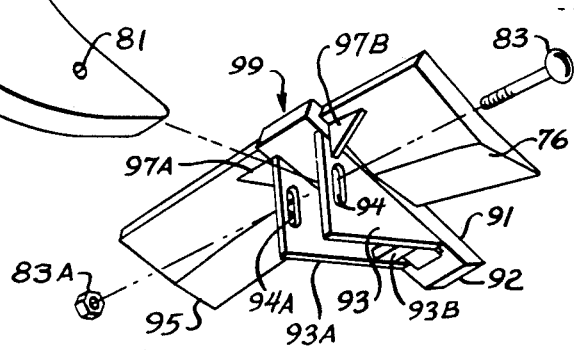
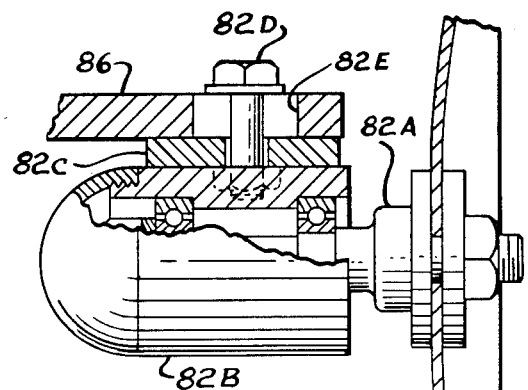
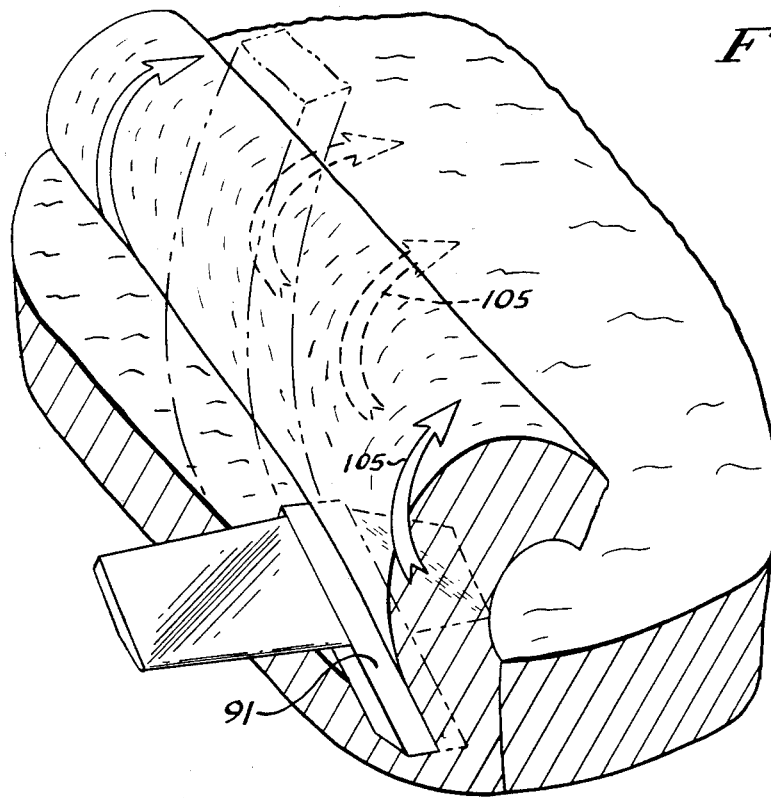

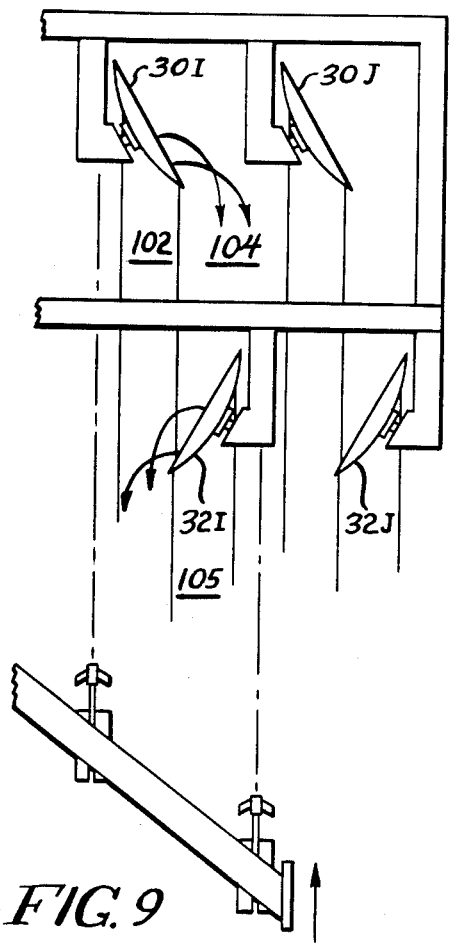
FIG. 9
FIG. 10
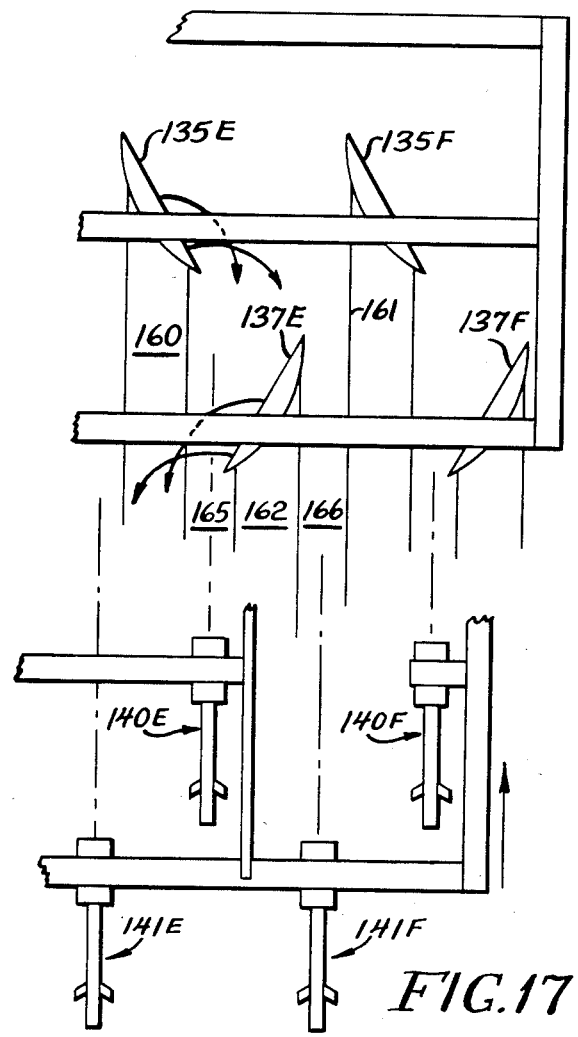
FIG. 17
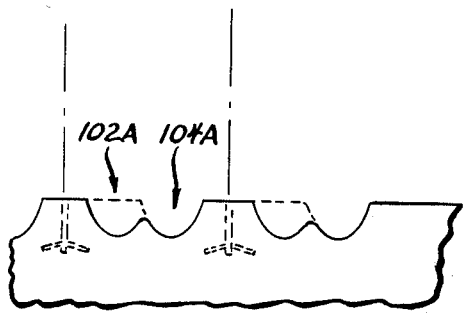
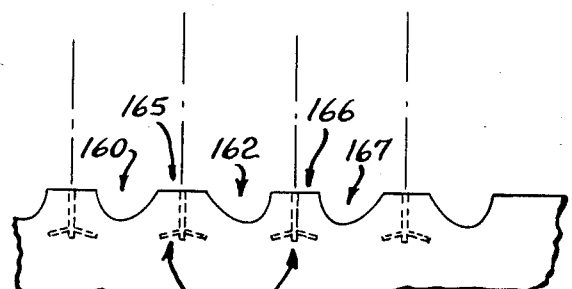
FIG. 18

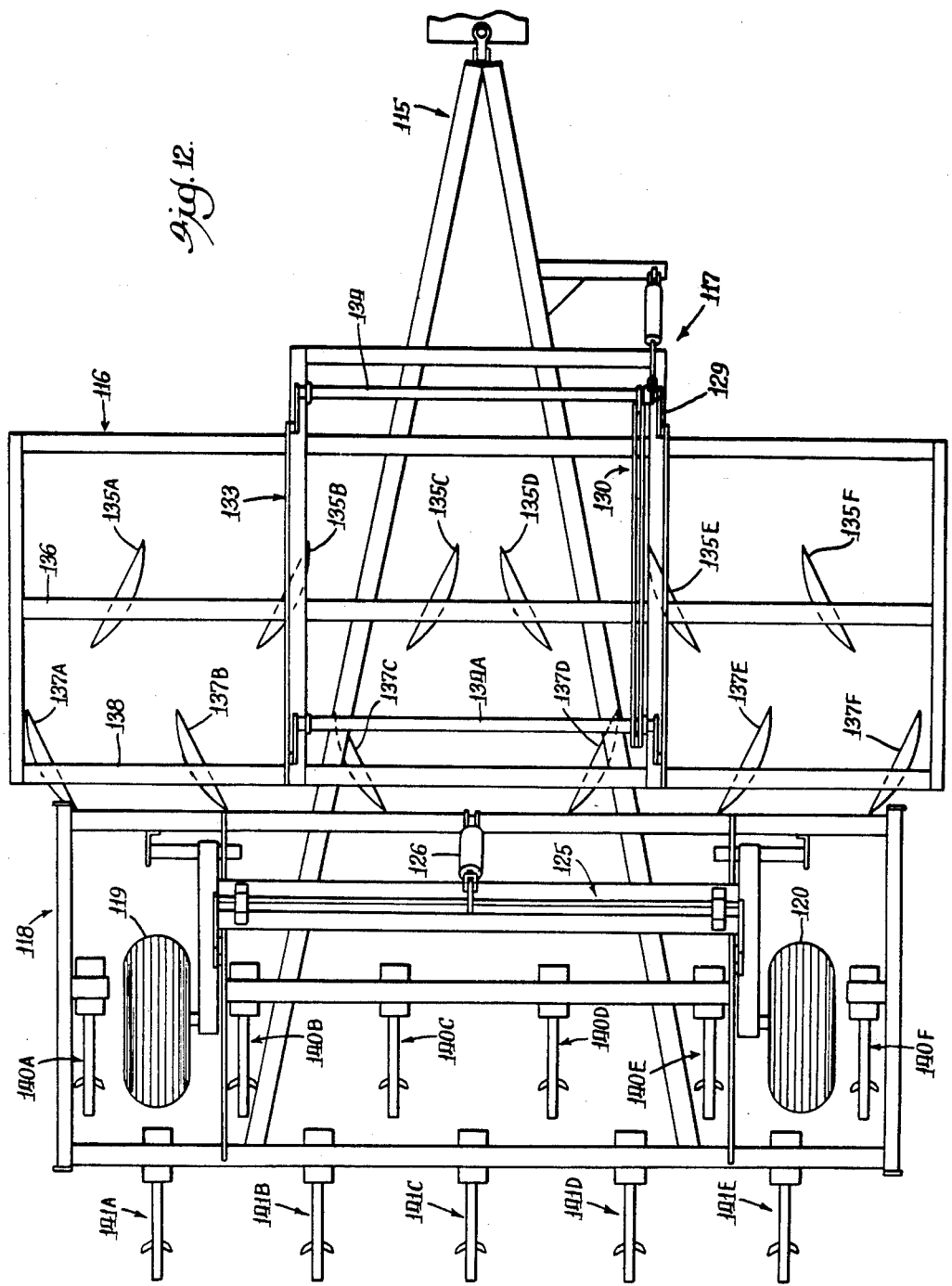

ONE-PASS COMPLETE TILLAGE SYSTEM

RELATED APPLICATION

This is a division of application Ser. No. 220,419, filed Dec. 29, 1980, now U.S. Pat. No. 4,403,662, which is is a continuation-in-part of my co-pending application for ONE PASS COMPLETE TILLAGE SYSTEM, filed Aug. 17, 1978, Ser. No. 934,585 now U.S. Pat. No. 4,245,706.

BACKGROUND OF THE INVENTION

The present invention relates to an agricultural tillage system; and more particularly, it relates to a tillage system which is capable of a complete working and plowing of unplowed ground in a single pass.

Perhaps the most commonly used tool for plowing is the conventional moldboard plow. Usually the plow bottom is set at a particular depth of plowing, for example, eight or ten inches, but as deep as twelve or fourteen inches in some cases. These plows are typically mounted to a main beam which is inclined relative to the direction of travel of a tractor so that each moldboard is set to take a swath or strip of ground, cut it, and roll the ground over into a furrow formed by the next forward moldboard. The leading moldboard turns its strip of ground over into a furrow formed on a previous pass of the plow system.

When a moldboard plow is used repeatedly to plow ground at the same depth, a layer of highly compacted soil is formed just beneath that depth. This is called the plow "sole", and it has the disadvantages that, due to its compactness, roots of plants have difficulty in penetrating it, and water has a tendency to drain over the plow sole rather than being absorbed by the soil. Further, a moldboard plow displaces to one side all of the soil that is tilled. Eventually, the ground must be plowed in the opposite direction, and even when this occurs, a deep side ridge normally is left at the end swath.

One advantage of the moldboard plow, not found in devices which work a more shallow depth is that they bring up deep soil and this is believed to be effective in reducing herbicide built up near the surface.

In the case where moldboard plows are used for tilling soil which has not previously been cleared, and may contain some "trash" (that is, crop residue which, in the case of corn, may be bulky and tough), a coulter may be located in front of each moldboard plow to cut through the trash and at least partly through the soil. This reduces accumulation of trash on the leading edge of the moldboard, and it further assists the moldboard in cutting the soil. Coulters are also used in connection with other tillage systems, and they generally are in the form of a relatively flat, circular blade.

Another form of blade that is used in tillage systems is referred to as a "disc", and it takes the shape of a dish or bowl. The edge of the disc blade is used to cut trash, and the concave surface of the blade is used to throw some of the top soil to the side. Typically, a plurality of disc blades are arranged at a relatively close spacing, and they may be mounted on a common shaft which extends at an acute angle relative to a line transverse of the direction of travel of the tractor. When a gang of disc blades is pulled across a field, complete coverage is obtained. That is, all of the soil is tilled, the trash is cut up, mixed with the top soil and some trash is buried. Complete coverage is obtained because the spacing of adjacent discs is typically about forty per cent of the diameter of a disc, and the discs are turned slightly to work a path.

In these devices, to reduce the effect of lateral soil displacement due to complete workage, a second line or gang of discs, facing the other direction, may be placed behind a first line. Similarly, a given line or gang may be formed in a chevron shape, symmetrical about the center line of the system. In all such cases, however, the effect of the disc blades is to work all of the soil, rather than selected strips, since the primary purpose of the disc is to cut the trash. If a farmer then treats the disced land with a chisel plow for deeper working of the soil, the chisel plow has the effect of digging up the buried trash, and bringing the trash back to the surface.

Other implements use disc blades, such as listers and bedders, but the function of the disc blades in these implements is to create raised beds for seeds, with lateral troughs for water collection or irrigation.

Another type of implement used to cultivate the soil is referred to as a cultivator sweep, and it takes the form of a V-shaped blade with laterally and rearwardly extending wings which are at the same horizontal level. This type of device breaks the soil and lifts it, but it has the effect of throwing loose soil to the side and compacting the soil beneath it, thereby creating a new plow sole.

SUMMARY OF THE INVENTION

The present invention is directed to a tillage system which is designed to do complete tillage of the soil in a single pass. That is, it cuts and buries trash, and it also provides a controlled amount of deep soil plowing without creating a plow sole. These functions are achieved through the cooperative action of widely spaced disc blades followed by plow points located in the strip of soil left untilled by the forwardly located discs. The action of the discs is characterized by an agressive tilling of the soil and top trash. By agressive action, it is meant that each disc blade is placed at a depth and working angle and spaced from an adjacent disc blade such that its leading edge cuts the trash and the disc blade scoops or shovels the soil and trash at a depth of four to six inches by turning it over, mixing the trash and soil and displacing the mixture laterally.

The system includes a pull-type frame with a forward line of disc blades which are widely spaced to part the trash. In one case, the discs are spaced laterally from one another at a distance greater than the diameter of the disc. Another way to say this is that the discs are spaced not to achieve full coverage, but rather to leave swaths of substantial width in relation to the width of the swaths actually cleared by a blade. This is in contradistinction to the spacing of conventional ganged disc blades where each line of discs gives full coverage of the ground. The discs of the present invention may be individually mounted and discs on different sides of the frame may face opposite directions in order to minimize clogging on adjacent blades. In this case, it is the spacing of the working surfaces, not the non-working surfaces of the discs which must be substantial.

A second line of disc blades, also widely spaced is placed to the rear of the first line; and these blades are offset laterally from, and located in the windrows formed by, the discs in the first row. Thus, the discs in the second row part the windrows created by the discs of the first row. The discs of the second row are preferably mounted to face oppositely to the associated discs of the first row to return at least some of the soil and trash displaced by the first row as well as the soil it tills so there is no net lateral displacement of soil. The spacing and location of the discs in the second row also leaves some of the soil undisturbed but having an accumulated layer of trash and loose soil on top.

Located behind the blades are novel tools or plow points which are located in the strips of soil left untilled by the blades with mixed trash and soil accumulated on top of these strips from the action of the blades. These tools each include a forward tooth for breaking the soil beneath the level of working of the disc blades. Wings extend outwardly and rearwardly of the tooth portion of the tool at a shallow angle. That is, the forward edges of the wings slope downwardly and slightly rearwardly from the point at which they join with the tooth. After the tooth breaks the soil, the wings raise, twist and turn the broken deep soil, thereby mixing the trash with top soil, evenly distributing the mixed soil and trash over the ground, burying a controlled amount of trash, and bringing up some deep soil. The outboard rear edge of each wing may be turned slightly downward which enhances the twisting motion of the soil. All of this is done without creating a plow sole. The broken deep soil is better able to absorb water and become worked by the winter's freezing and thawing cycles.

The structure which cooperates to avoid creation of a plow sole includes the cutting edge of the tooth which is relatively narrow; the shape and orientation of the wings, the function of which is to lift, twist and roll the soil, without creating lateral displacement of the soil to any substantial extent; and the slope and location of the leading edge of the wings in relation to the shape and position of the tooth, which provides clearance for soil to pass beneath them without compacting it. By adjusting the depth of the tools relative to the disc blades, a controlled amount of the trash may be buried. Hence, for sloped land, lesser amounts of trash are buried, to prevent surface erosion; while for flat land where there is no fear of soil erosion, the trash can be buried more deeply.

The lateral spacing of the plow tips is wider than in a conventional chisel plow, and determined primarily by the configuration of the forward disc blades. That is, a plow tip is located in each strip of previously undisturbed soil. This insures that as ground is broken, the plow tip does not bring up previously buried trash, since it is desired to keep the trash buried. Other plow tips may be located in strips in which the top soil may have been cleared by a forward disc blade, but in which subsequent disc blades have accumulated a surface mixture of trash and top soil. This insures, through the twisting, turning action of the plow tip wings after the ground is broken, that the accumulated trash will be further mixed. Plow tips may be offset from the center of the unplowed strips following the discs to reduce the accumulation of trash across the plow point.

Wheels supporting the overall machine may be located ahead of the plow tips and behind the discs in the untilled area thereby reducing drag and providing a more even and stable ride.

Preferably, the disc blades are mounted on a subframe which is vertically adjustable relative to the main frame which carries the plow tips by means of hydraulic cylinders operated from the driver's position so that the depth of the disc blades can be varied relative to the depth of the plow tips while the system remains "on the go". The deeper the disc blades work, the more deeply will the trash ultimately be buried. In this manner, as indicated, by adjusting for a more shallow working by the discs, more trash will be buried near the surface (and some trash will even be on the surface) after the system has completely worked the soil, resulting in reduced soil erosion and promoting quicker decay. A principal advantage of the present invention is that such adjustability permits each farmer to control the amount of tillage and conservation he wants to practice while permitting him to make further adjustments "on the go" as required by changing conditions he encounters.

It is preferred that all the disc blades in each quadrant of the machine face the same lateral direction thereby avoiding the tendency toward clogging on the adjacent blades on the rear set. The outward blades on the rear set displace soil inwardly avoiding a net displacement of soil outside the swath cut by the machine. The outward displacement of soil on the front set of discs can be controlled by use of dirt shields.

In summary, the present invention provides complete tillage in one-pass system wherein forward, widely spaced disc blades are used to break up and windrow trash and soil while leaving untilled strips of substantial width, and rear plow points break the soil beneath previously undisturbed strips on which some mixed trash and top soil preferably have been accumulated. The points twist and roll the broken soil, thereby mixing the trash with top soil, laterally distribute the mixed soil and trash, bury a controlled amount of trash, and bring up some deep soil. This is all accomplished without creating a new plow sole or digging up the buried trash, and while leaving the tilled soil free of ridges and furrows so that it can be subsequently seeded without substantial additional tillage. Further, the apparatus does not cause a net lateral displacement of soil, so that it can work the soil in either direction relative to a previously worked swath.

Other features and advantages of the present invention will be apparent to persons skilled in the art from the following detailed description of preferred embodiments, accompanied by the attached drawing wherein identical reference numerals will refer to like parts in the various views.

THE DRAWING

FIG. 2 is a right side view of the apparatus of FIG. 1 in use, with the tractor again shown in fragmentary form;

FIG. 3 is a vertical illustration of the soil being worked from behind the plow points which are shown in fragmentary form, and illustrating the operation of the present invention;

FIGS. 4 and 5 are frontal perspective and front elevation views respectively of an improved plow point for the system of FIG. 1.

FIG. 6 is a plan view of the improved plow point for the system of FIG. 1;

FIG. 7 is a lower rear perspective view of the plow point of FIG. 4 illustrating its attachment to a shank, with the parts shown in exploded relation;

FIG. 8 is a perspective view of the plow point of FIG. 4 illustrating its operation in the soil;

FIG. 9 is a diagrammatic plan view of a portion of the system of FIG. 1 illustrating its operation;

FIG. 10 is a soil profile illustrating the operation of the apparatus of FIG. 9;

FIG. 11 is a close up side view, partly in cross section, showing the mounting of a disc blade;

FIG. 12 is a plan view of an alternate tillage system incorporating the invention;

FIG. 17 is a diagrammatic plan view of a portion of the system of FIG. 12 illustrating its operation; and FIG. 18 is a soil profile illustrating the operation of the apparatus of FIG. 17.

DETAILED DESCRIPTION

Embodiment of FIGS. 1-11

Figure 1:
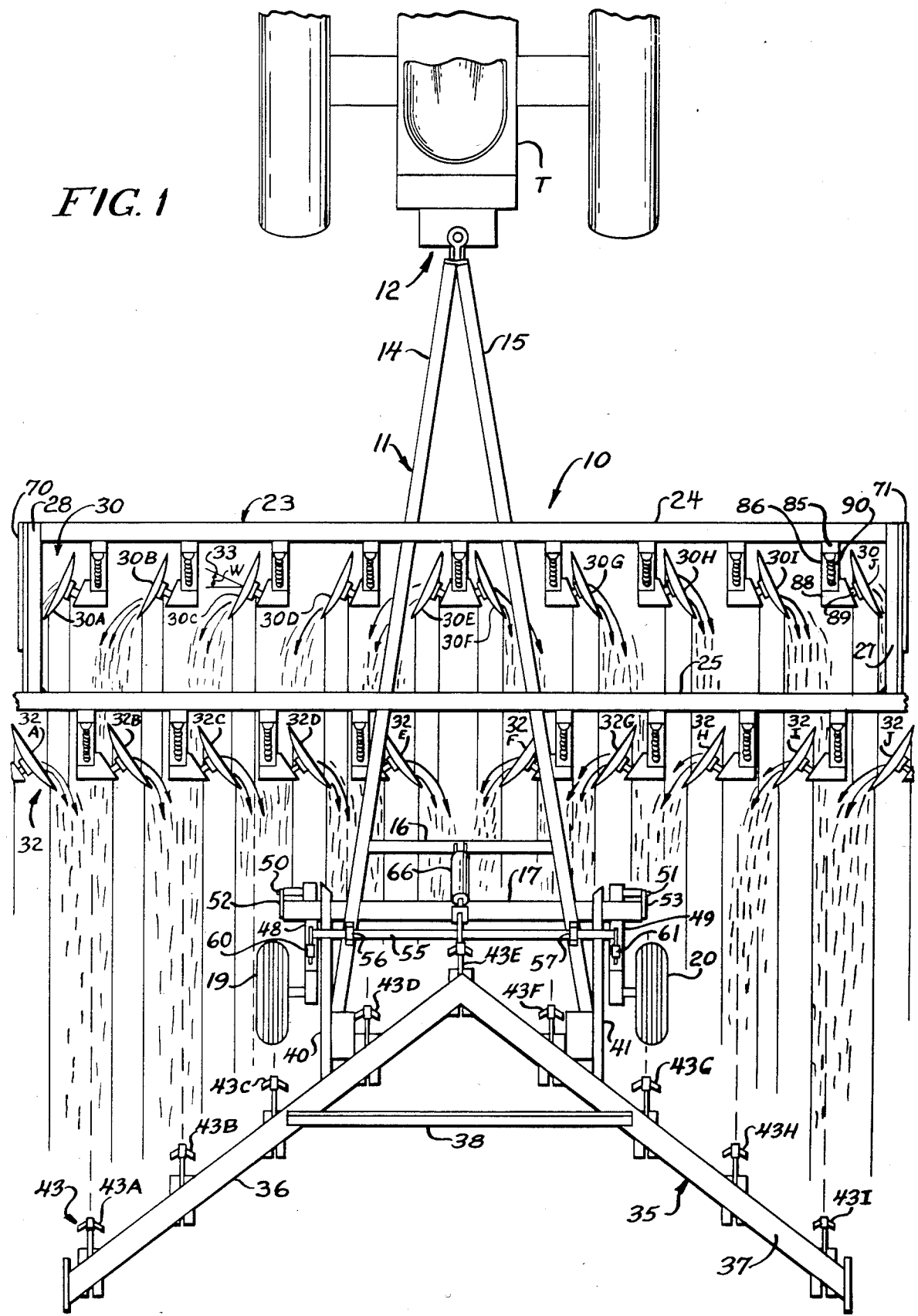
FIG. 1 is a plan view of an apparatus incorporating one embodiment of the present invention attached to the rear of a tractor, which is shown in fragmentary form.

Referring first to FIG. 1, reference numeral 10 generally designates the overall machine which is shown as being pulled toward the top of the page by a traction vehicle designated T. The plow system includes a rigid frame generally designated 11 attached to the rear of the tractor by means of a hitch point 12.

The main frame 11 includes first and second elongated side frame members 14, 15 which are braced by a first cross frame member 16 and also by a main cross member 17 which is connected to support wheels 19, 20 as will be described. A forward box-shaped frame generally designated 23 includes forward and rear transverse frame members 24, 25 welded to the top of the inclined side members 14, 15. The outboard ends of the transverse frame members 23, 24 are braced by longitudinal side frame members 27, 28 respectively.

A first or forward set of disc blades (sometimes referred to simply as "discs" or "blades") generally designated 30 is mounted to the forward cross frame member 24; and a second or rear set of similar disc blades 32 is mounted in a similar fashion to the rear transverse frame member 25 of the box frame member 23. The mounting structure for the disc blades will be described presently. The individual blades of the forward set are designated 30A-30J respectively and the individual blades of the rear set are correspondingly designated 32A-32J respectively.

Each of the disc blades is mounted for rotation about a horizontal axis, such as that designated 33 for the disc 30C which defines an angle, W, called the working angle relative to a line transverse of the direction of travel. For the present invention, the working angle is advantageously within the range 24-34° and preferably about 30°. The spacing of adjacent disc blades and the relative placement of cooperating front and rear disc blades will be described below.

Turning now to the rear of the frame 11, a plow point support frame having the general shape of an inverted V and generally designated by reference numeral 35, includes first and second side members 36, 37 which are braced by an angle iron 38, and are attached to the transverse frame member 17 by horizontally extending connection members 40, 41.

A set of plow points generally designated 43 and including nine individual points designated respectively 43A-43I are mounted to the point support frame 37, as best illustrated in FIG. 2.

The support wheels 19, 20 have their axles journaled respectively in arms 48, 49 which, in turn, are pivotally connected at 50 and 51 to brackets 52, 53 respectively, which are welded to the outboard ends of the transverse frame member 17.

A rock shaft 55 is supported in pillow blocks 56, 57 mounted to the inclined side frame members 14, 15; and its outboard ends, which terminate respectively above the wheel support arms 48, 49 there are welded first and second links 60, 61, the lower ends of which are pinned to the wheel support arms 48, 49 (see the right side link 61 in FIG. 2.) The upper portions of these links are connected to second links, one of which is shown at 63 in FIG. 2 which are, in turn, secured to the rock shaft 55.

Still referring to FIG. 2, a link 65 is rigidly connected to the center of the rock shaft 55, and its upper end is pivotally connected to the rod end of a hydraulic cylinder and rod unit generally designated 66, the cylinder end of which is pinned at 67 to the cross frame member 16 of the main frame. When the hydraulic cylinder unit 66 is extended (the controls are preferably located adjacent the driver's location on the tractor T), it cranks the arm 65 to rotate the rock shaft counterclockwise in FIG. 2, thereby urging the wheel support arms 48, 49 downwardly, and raising the main frame 11 and the plow point frame 35 in unison. In this manner, the working depth of the plow points is adjusted. The cylinder 66 is a double-acting cylinder which is connected to the operator's control in a conventional manner by two hydraulic hoses which are omitted for clarity.

Turning back to FIG. 1, it will be observed that for the forward set of discs 30, those to the left of the center line of the machine have their working surfaces facing toward the left of the machine to displace soil and trash in that direction. Similarly, those to the right of the center line of the machine in the forward set 30 face to the right. Adjacent each of the outboard discs 30A and 30J, there are located dirt shields designated respectively 70 and 71, see the shield designated 71 in FIG. 2. Each is mounted in a similar fashion.

Turning then to the shield 71, it includes two sets of vertically spaced apertures generally designated 73, 74 for mounting to upright angle irons 75, 76 respectively by means of a pair of forward bolts 78 and a pair of rear bolts 79. Additional holes are provided at the same spacing in the dirt shild so that it may be adjusted up or down, as desired. Further, the lower portion of the leading edge of the dirt shield is curved as at 80 so as to prevent the accumulation of trash or weeds during operation.

The discs 32 on the rear set have their working surfaces facing towards the center of the apparatus and consequently displace soil inwardly thereby obviating any build up of soil or a net displacement of soil outside the swath cut by the apparatus. This permits the apparatus to work the soil in either direction relative to a previously worked swath. The outermost blades 22 on the rear set, if they are the same size as the other blades, can be mounted one inch higher and at a slightly lesser working angle, preferably slightly less than 25°, so as to avoid leaving a furrow. Alternatively, raker blades of smaller diameter can be used since the only function of these blades is to fill the furrow left by the associated blade in the forward set.

Thus, all the blades in both the front and rear sets face in the same direction for each quadrant of the machine. This avoids a tendency towards clogging or plugging as might occur with adjacent blades facing each other.

Turning now to the mounting of the blades, each of the blades is mounted on an upright support, such as that designated 85 for the blade 30J, which support is welded to the rear surface of the crossbar 24. A rearwardly extending bracket (FIG. 1) is pivotally mounted at 87 of FIG. 2. A spring 90 urges the bracket 86 downwardly by reaction against the upright support member 85 to cause the discs to engage the soil for penetration while permitting them individually to ride over rocks or stumps.

The blade 30J is mounted to a spindle 82A which is journaled in a hub 82B. The hub 82B is welded to a plate 82C which, in turn, is bolted to the bracket 86 by means of a forward and a rear bolt, the rear bolt being seen in FIG. 11 and designated 82D. The forward bolt acts as a pivot point, and the rear bolt is received in a laterally elongated slot 82E formed in the bracket 86. By means of this arrangement, the blades can be individually adjusted by rotation about vertical axes. By rotating the disc to cut a wider path (i.e. increasing its working angle), more soil will be displaced laterally, and during operation, the soil and trash will be thrown more to the side than for a smaller working angle.

The sets of blades, when thus arranged, leave strips or swaths which are alternately cleared and undisturbed, at least some of the cleared trash being accumulated onto the strip of undisturbed soil. It will be observed from FIG. 1 that the blades of both sets are spaced to leave strips of soil of substantial width in relation to the width of a cleared swath, preferably, the spacing of adjacent blades facing the same direction is at least 80% of the width of a swath cleared by a blade. The outermost blades in the second line, 32A, 32I may be spaced laterally inwardly at a slightly narrower spacing than normal since they are normally angled less. On the large rear chevron frame comprising beams 35, 36, there are nine individual plow points designated respectively 43A–43I, at equal lateral spacings.

Turning now to FIGS. 2 and 4–7, each of the plow points is similar in structure, and each is mounted on a heavy shank 73, which is conventionally mounted to one of the beams 35, 36. The lower end of the shank forms a nose, the upper surface of which is designated 75, and this forms a bearing surface for a groundbreaking and working tool or point generally designated by reference numeral 99. A transverse aperture 81 is formed in the nose of the shank 73 for securing the tool 99 by means of a bolt 83 and nut 83A.

The tool 99 is seen to comprise a narrow, flat member 91 (sometimes called a "tooth") which may be formed from hardened bar stock, and having a lower, sharpened cutting edge 92. First and second mounting plates 93, 93A are welded to the bottom surface of the tooth 91, and they are held apart by a spacer 93B. Slots 94, 94A are formed in the mounting plates 93, 93A for alignment with the aperture 81 on the nose of the plow shank, for receiving the bolt 83.

A pair of wings 95, 96 are welded to the sides of the tooth 91, and they are braced against the tooth and the mounting plates by triangular brace members 97A, 97B respectively. As best seen in FIGS. 4 and 5, when the point is in the working position, the leading edges 95A, 95B of the wings 95, 96 are sloped downwardly and rearwardly. The rearward slope of the leading edges 95A, 96A relative to a line transverse of the direction of travel of the plow tip (designated 99A in FIG. 6) is preferably about 30° for most soil conditions found in the Midwest of the U.S. For general conditions, this slope is less than or equal to 30°, in the range of 25°–32°, although, if soil ridging is desired for snow or water retention, the slope may be up to 40°.

The inboard ends of the leading edges 95A, 96A are designated respectively 95B and 96B in FIG. 5, and the location at which these points join the tooth 91 are above the leading cutting edge 92. The upper, working surfaces of the wings 95, 96 may be slightly concave; and their outboard rearward edges 95C, 96C may be formed downwardly out of planar relation with the rest of the upper surface of the wing to reduce lateral throwing of soil. The formation of the wing in which the outboard rear end is turned downwardly so that the wing appears bent along a diagonal parallel to the lines of shading in FIG. 4, has the further effect that the soil adjacent the inboard edges of the wings is twisted more than the soil lifted by the outboard edges. As shown in idealized form in FIG. 8, the twisting motion causes the soil to turn about an axis parallel to the direction of travel of the vehicle as indicated by the large arrows. It will be appreciated that trash and top soil has been windrowed above the strip of ground worked by the plow tip, and the windrowed soil and trash is also caught up in the twisting motion caused by the plow tip and buried.

In summary, the curvature of the working surfaces of the wings, together with the rearward and downward slope of the leading edges of the wings, the relationship of the placement of the wings to the leading edge of the tooth, and the downwardly turned outboard rear edges of the wings cooperate to induce a twisting, turning motion to soil loosened by the breaking action of the tooth without displacing that soil laterally to any substantial degree. In other words, most of the trash remains in the same general swath worked by the point; although some will obviously be thrown sideways depending on the soil and operating speed. By imparting a twisting, turning motion to the soil, the previously undisturbed soil above the wings is turned over to cover the trash accumulated on the previously untilled strip and to bury the trash in the furrow cut by the plow tip. Further, due to the depth at which the plow tip works, and the soil profile formed by the preceding blades, the sub-surface soil is fractured and broken but not vertically displaced substantially above lines such as the dashed lines illustrated in FIG. 3 and designated 98. This has the advantage of breaking up soil beneath the surface to increase its ability to absorb moisture while reducing erosion because the trash is mixed throughout the upper surface to hold down the surface soil. With a high moisture content, the large pieces of soil beneath the surface will, upon the repeated freezing and thawing of winter, create a more mellow subsoil. It will also be observed that the blades work at one depth and in one swath; the wings work a deeper depth and different swaths; and the teeth work a still deeper depth and narrower, different swath. This reduces any tendency to create a plow sole or "hard pan" as the soil is tilled year after year.

Operation of Embodiment of FIGS. 1–11

Returning now to FIG. 1, the centers of the blades of the forward set 30 are laterally spaced at a distance which is greater than the diameter of the blade. In other words, the lateral distance between corresponding parts of adjacent blades facing the same direction is greater than the diameter of the blades. For example, if 24 inch or 26 inch blades are used, then the blades are set at a spacing of approximately 30 inches on center. This is not so for the adjacent center blades 30E and 30F because they throw the cleared top soil in opposite directions.

The blades on the second set 32 are also widely spaced in the same manner; they are located relative to an associated blade on the first set such that the blade on the rear set parts the windrow of mixed soil and trash formed by the associated blade on the first set. A pair of blades, one of the first set and one of the second set, are said to be "associated" with each other or in "cooperating" relation with each other when the blade on the rear set works not only the previously undisturbed soil, but also some of the mixed soil and trash that had been windrowed onto that strip by the "associated" forward blade. For example, referring now to FIG. 9, the blade 30I of the forward set clears a path 102, and the trash and top soil cleared from that path are displaced to the right onto a windrow at 104. The leading edge of the blade 32I on the rear set is such as to part the windrow 104 and to clear a second strip of ground 105, see also FIG. 10.

The trailing edges of the forward blade 30I and the rear blade 32I overlap slightly so as to insure that both blades cooperate to form a single wide furrow such as is shown in the soil profile of FIG. 10 at 102A, 104A. It will be appreciated that the actual width of a strip worked by a blade is less than its diameter since the axis of the blade is located above the soil and it is turned at a working angle. The leading edge of a blade has a tendency to cut a clean furrow wall, but the trailing edge, due to lateral forces created by the blade on the soil, has a tendency to scoop out soil laterally. Further, where the strip adjacent a rear blade is already cleared and the soil is weakened along a furrow wall, the action of a rear blade will be to break away the top of the wall. For example, the furrow cut by the disc 30B is designated 108 in the close up view of FIG. 3. It may have a depth of four to six inches and a width of ten to twelve inches for a blade having a diameter of twenty-four inches and a working angle of 27°. It displaces the soil it tills to the left. The blade 32B clears an adjacent strip and displaces that soil toward the right. It forms a furrow such as that shown at 109. However, because of the lateral force created by the trailing edge of the blade 32B, and because it is working into the already-formed furrow 108, it breaks away the soil to a depth such as indicated at 110. The plow point 43A works the strip of previously untilled soil represented by 112 and on which a windrow has been formed by the cooperative action of blades 30A, 30B and 32A. It will be appreciated that the blade 30A directs its soil to the left against the dirt skirt 70 to form a windrow which is then thrown to the right by blade 32A.

In the first embodiment, the shank of the plow point 43A is preferably located off-center relative to the strip 112. In other words, the shank 43A is offset laterally relative to the center line of the strip of untilled soil on which trash is windrowed. The working depth of a plow point is deeper than that of a furrow cut by a blade. In this example, the plow point may be working at a soil depth of ten to twelve inches. By placing the shank of a plow tip off center relative to the strip of previously untilled soil in which it works, any trash that would otherwise have a tendency to bridge across the plow shank will flow to the side because of unequal drag forces causing it to slide off the shank as the shank passes. Thus, there is no accumulation of trash on the shank. This is important because any accumulation of trash will not only greatly increase the drag on the apparatus, but it will have a tendency to cause the trash to be discharged in large clumps on the surface after build up, and thereby defeat a primary purpose of the apparatus which is to achieve a controlled burying of the trash.

In this example, the shanks of the plow points are on thirty inch centers, and the nominal width of an untilled strip such as 112 in FIG. 3 may be about six to seven inches. The center of the shank of the plow tip 43A is located approximately two to two and one-half inches from the wall of the furrow 109, and five to five and one-half inches from the wall of the furrow designated 115 which is formed by the blade 32A.

Because of the formation of the furrows by the plow blades, the top soil will be weakened and partly broken, and in addition to the soil above the plow points which is twisted as described above to bury the trash windrowed above the strip of soil 112, the soil between the plow points beneath the blade furrows is broken into large pieces, but not displaced, as diagrammatically represented by the fracture line 98 in FIG. 3. All of the furrow walls and lines indicated above for purposes of explanation are, of course, idealized in the sense that they will not occur as straight lines or smoothly curved lines in the field, and there will be variation for different soil conditions. The soil profile is disclosed merely for purposes of explaining the major functions performed by, and the interrelationships of, the elements of the apparatus.

As mentioned, when the strip 112 is tilled by the plow point, the soil is twisted by the action of the plow point, as diagrammatically illustrated by the arrows in FIG. 3, and the showing of FIG. 8; and some deep soil is brought up and mixed with the trash that has been windrowed on top of the strip, as well as the trash not yet worked on the strip 112. It is desirable to have some trash at the top of the soil to reduce surface erosion by wind and water. However, most of the trash is buried and mixed with the soil to promote decay.

It will also be appreciated that the blades work the soil at one depth (e.g. 5 in.); the wings at another, greater depth (6–7 in.); and the point at a still greater depth (10 in.). This reduces any tendency to form a plow sole or "hard pan" as it is sometimes called.

Referring again to FIG. 8, the action of the plow point as it is pulled through the ground is, as mentioned, diagrammatically illustrated. The cutting edge 92 on the tooth 91 has the effect of breaking the ground immediately preceding it. The upward, rearward inclination of the tooth 91 (namely, on the surface designated 91A in FIG. 8) assists in lifting the soil and causing further breaking of that soil. The wings, on the other hand, take the broken soil and displace it in the direction of the larger arrows 105, causing it to twist in the shape of a vortex downwardly in a smooth conformation. This action is promoted by the fact that the leading edges of the wings extend downwardly and outwardly as well as slightly rearwardly from their intersection with the tooth 91. The twisting, turning soil further breaks apart, some of which, after mixing with accumulated trash, fills the void left by the tooth, and the remainder spreads evenly over adjacent areas due to the impact of the plow points. The clearance beneath the wings avoids compacting the soil while permitting this action.

Because of the cooperative action between the disc blades in removing strips of top soil as indicated above, as well as the structure and operation of the plow points at the high speeds at which this machine is designed to operate, the final soil profile is made relatively free of deep ridges and furrows. By placing the shanks of the plow points closer to one furrow wall than the other in the untilled strips, there is less of a tendency for trash to bridge across and accumulate on the shank.

Referring back to FIG. 1, it will also be appreciated that the support wheels 19, 20 do not leave compacted strips of soil because they are located to ride in strips of untilled soil left respectively between blades 30C and 32D, and blades 30H and 32G. Plow points 43C and 43G work the soil in these strips after the support wheels have passed, and the apparatus has the advantage that the support wheels do not run in furrows, thereby permitting the apparatus to ride evenly and with more stability.

Embodiment of FIGS. 12–18

Figure 13:
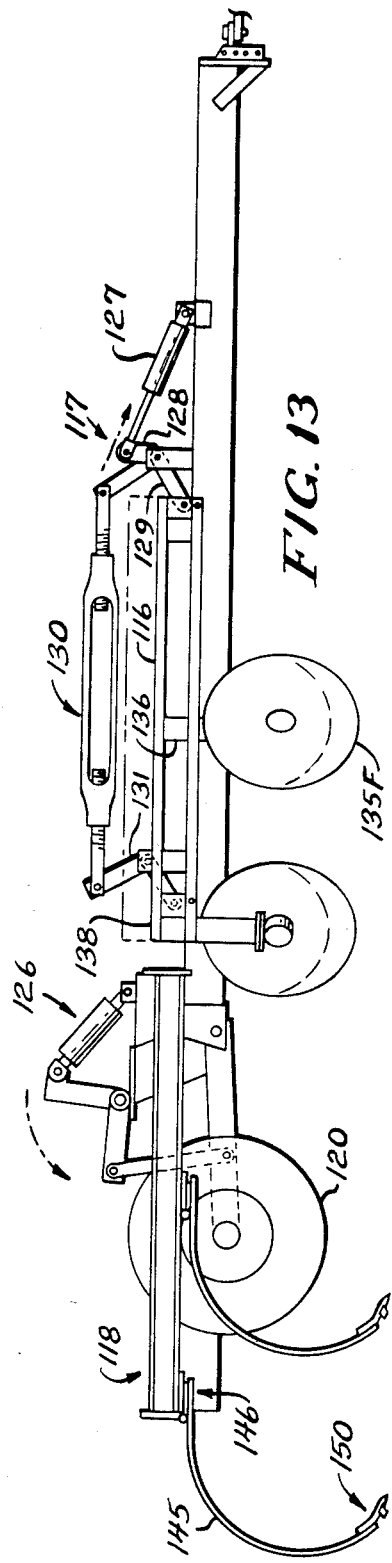
FIG. 13 is a side view of the embodiment shown in FIG. 12.

Turning now to FIGS. 12 and 13, a draft frame is generally designated by reference number 115, again having a general chevron shape. A forward disc blade frame is generally designated 116, and it is vertically adjustable relative to the draft frame by means of a parallel lift mechanism generally designated 117. A plow point frame generally designated 118 is mounted to the rear portion of the main draft frame 115. A pair of support wheels 119, 120 are mounted to the rear frame 118 by means of a height adjustable mechanism generally designated 125 and actuated by means of a hydraulic cylinder 126, similar to that which has already been described in connection with the first embodiment.

As best seen in FIG. 13, the forward frame 116 is raised by retraction of an adjusting mechanism including an hydraulic cylinder 127. The adjustment mechanism also includes an actuator arm 128 pivotally connected to the rod end of the hydraulic cylinder 127. The other end of the actuator 128 is attached to a shaft 134 (FIG. 12) which is rotatably mounted to the main frame 115. A link 129 is welded at one end to rotate with the shaft 134 and has its other end pivotally connected to the frame 116. A parallel linkage generally designated 130 is also controlled by actuator 128 and shaft 134, and it extends rearwardly to operate a crank 131 mounted to a rear shaft 134A and connected to lift the rear of the disc blade frame 116. A similar parallel linkage is located on the other side of the frame (see FIG. 12) for stability in lifting the frame. The two parallel linkages are connected together by means of the crank shafts 134, 135 which are, in turn, secured to the draft frame 115 to act as a base against which the forward or disc blade frame 116 is raised. The link 130 may be a turnbuckle link, as shown, to make minor adjustments in the operating depths of the front and rear sets of disc blades.

Although the actuating mechanisms for the rear crank shaft 134A have been described as "parallel" linkages, the long horizontal links can be made adjustable in length, or, as is preferred, the rear shaft 134A can be mounted slightly lower than for a true parallelogram linkage. This will accommodate the tolerances and wear involved to maintain the front and rear sets of blades at equal and uniform depths under use conditions.

Referring now to the rear frame 118, a first plurality of plow points designated 140A–140F are secured in a first transverse line, and a second plurality 141A–141E are secured to the rear frame 118 along a second line.

Turning now to FIG. 13, the plow points are each similarly mounted, including a curved spring shank 145 which is mounted by a conventional spring mount 146 to the frame 118. Each spring shank is provided with a ground working tool or plow point generally designated 150 and seen in more detail in FIGS. 14–16.

The plow point 150 includes a downwardly and forwardly curved tooth 151 which is narrowed to a point at 152 and has a central work surface 153 generally in the shape of a knuckle. Immediately behind the work surface 153, the tooth slopes at 154 to conform to the narrow width of the shank portion of the tooth.

As with the previous plow point, a pair of wings 160, 161 extend laterally of the tooth 151, and they are provided with associated leading edges 160A and 161A which are sloped rearwardly and downwardly from locations 160B and 161B to the rear of and above the point 152. The work surfaces 160C, 161C are also concave to provide the rolling, twisting action for the broken soil. The shape of the leading edges and their relationship to the work surfaces 153 and point 152 again eliminate the creation of a plow sole even for repeated passes. The embodiment of the plow point and spring shank of FIGS. 12–16 is designed for more shallow working of the soil than is the case with the first embodiment.

In this embodiment, the size and working angles of the disc blades are similar to that disclosed in connection with the first embodiment, however, the disc blades are located at a wider setting. That is, the disc blades are set on forty inch centers. Further, the blades on the rear set are centered on the spaces between the blades on the forward set of blades.

This arrangement leaves strips of untilled soil between the working surfaces of the blades as well as the non-working surfaces. One set of plow points (the forward set in the illustrated embodiment, although that is not necessary) is located on twenty inch centers in the strips of untilled soil between the working surfaces of associated blades from the front and rear sets; and the other set of plow points (also on twenty inch centers) is located in the strips of untilled soil between the non-working surfaces of the blades which face or oppose each other.

Figure 16:
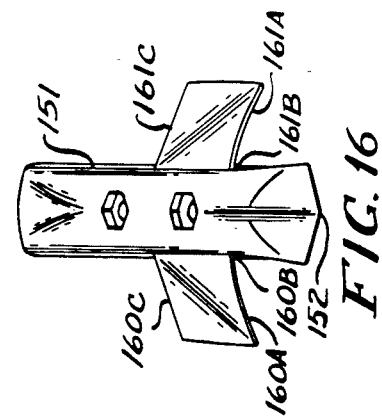
FIGS. 15 and 16 are respectively side and front views of the plow point of FIG. 11.
Figure 15:
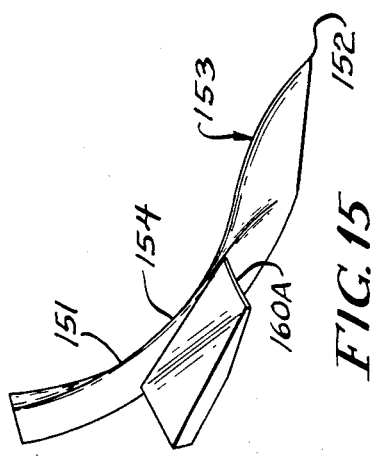
Figure 14:
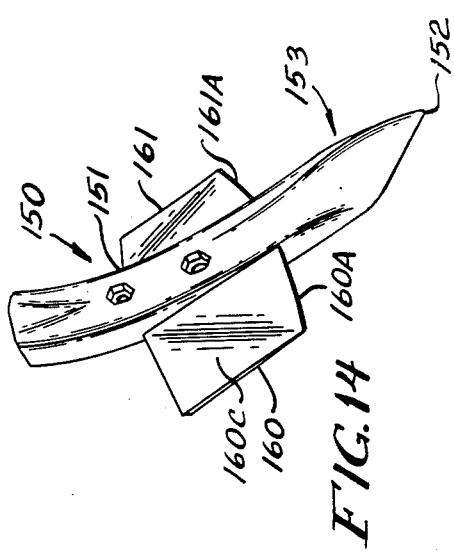
FIG. 14 is a frontal, side perspective view of an alternative plow point.

Because there are more plow points in the second embodiment, the points illustrated in FIGS. 14–16, which are narrower than those of the first embodiment may be used. The nominal width of the untilled strips is approximately the same, however, for both embodiments.

Operation of the Embodiment of FIGS. 12–18

Referring back to FIG. 12, as indicated, there are two sets of disc blades, forward and rear. The apparatus to the right of the center line extending in the direction of travel operates similar to that located to the left of the center line, so only one side need be explained for a full understanding. In the forward set, the three blades to the left of the center line, 135A–135C, each till a strip and throw soil in the same direction (namely, to the left). The blades are all widely spaced relative to each other. The three associated disc blades 137A–137C in the rear set face the other side. The blades of the rear set are located so as to part the windrow created by the associated blade in the forward set, partially filling the furrow left by the associated blade of the forward set and also creating a second windrow of soil and trash displaced in the opposite lateral direction. The windrows are created on both strips left untilled.

Referring now to FIGS. 17 and 18 which show the right side of the apparatus of the second embodiment, blade 135E of the forward set clears a strip and forms a first furrow designated 160. The soil and trash tilled by the blade 135E are mixed, forced laterally to the right, and spread across a path in front of blade 137E as well as on both sides of that blade. That is, blade 135E of the first set windrows the soil and trash it tills onto a strip which extends from its trailing edge over to the line 161 representing the path of the leading edge of blade 135F. The windrow is not of uniform depth, and obviously the path on which it is thrown is not so well defined—some of the soil and trash mixture is thrown so far as to enter the furrow formed by the blade 135F.

The blade "associated" with blade 135E is the blade 137E; and that blade parts the windrow formed by blade 135E and clears its own strip 162. The windrowed soil taken by blade 137E and the previously undisturbed soil it tills from the furrow 162 are also thrown over a wide path to the left of blade 137E. Some of this soil partially fills furrow 160; some is displaced even to the left of furrow 160; and some is thrown onto a strip 165. The strip 165 is located between the working surfaces of the associated pair of blades 135E, 137E; and soil from both blades will have accumulated on it, though not a substantial amount. Strip 165 lies in the path of plow point 140E which then does some deep tilling and forces the windrowed soil laterally into furrows 160 and 162 to even the contour.

To the right of blade 137E is a strip 166 on which at least some soil will have been windrowed from blade 135E of the forward set and blade 137F of the rear set. Strip 166 is located between the non-working surfaces of blade 135F and 137E; and it lies in the path of plow point 141F. Point 141F performs deep tillage of the soil beneath that strip and forces the windrowed soil mixture to be buried as well as to at least partially fill furrow 162 and a furrow 167 behind blade 135F.

Thus, the combination of first and second lines of disc blades forms alternate strips of (a) cleared ground or furrow; (b) first windrows (previously undisturbed ground on which some accumulated debris has been thrown, the amount depending on the angle of the blades, the speed of the vehicle, etc.); (c) furrow at least partially filled with a loose mixture of trash and top soil; and (d) second windrows. The first windrows are formed between the working surfaces of an associated pair of blades, one from the forward set and one from the rear set. The second windrows are formed between the non-working surfaces of one blade from the forward set and one from the rear set.

As with the previous embodiment, the support wheels 119, 120 are located to ride in strips of untilled soil left respectively between blades 135A and 137B, and blades 137E and 135F. Plow points 141A and 141E work the soil in these strips after the support wheels have passed, but the apparatus has the advantage that the support wheels do not run in furrows, thereby permitting the apparatus to ride evenly and with greater stability, and they do not leave strips of compacted soil.

Both embodiments provide a first working of the top soil with the disc blades which cut the trash and windrow at least a portion of it. The lateral spacing of the blades is made wide so as to leave swaths of undisturbed soil of substantial width in relation to the width of the cleared swaths. Hence, the blades also windrow or accumulate mixed trash and top soil. A second line of blades located in previously undisturbed soil, parts, windrows and moves the first windrow in the opposite direction. The blades are followed by a plurality of plow points including tools which are located in the strips of previously undisturbed soil on which trash and top soil have been accumulated by the blades.

The plow points not only break the soil at a location deeper than was worked by the blades, but they are provided with wings which twist and turn the soil, replacing the soil dug out with trash and top soil and causing an even distribution of the mixed soil and trash across the entire width of the system. The plow points bring up deep soil without creating a plow sole. In the case of the embodiment of FIG. 12, the blades are mounted on a vertically adjustable frame so as to control the working depth of the blades. The deeper the blades work, the deeper will the trash ultimately be buried, as may be useful in slightly sloped or flat terrain. If the blades work at a more shallow depth, more trash will be at the surface, and this may be useful in controlling erosion. By placing the cutting edge of the point beneath the level at which the blades work, and by accumulating mixed trash and soil on the top of previously undisturbed ground, the plow points do not dig up buried trash—rather, they bury trash accumulated on top of the area being worked. This is accomplished principally through the twisting, turning action provided by the rearwardly and downwardly swept wings.

By placing the disc blades at a wide spacing as defined above and by arranging subsequent lines of blades to split windrows created by previous lines, while forming their own windrows, the number of blades is reduced relative to conventional ganged disc blades, thereby increasing the weight and drawbar pull per blade for a given design and horsepower; and the spacing of plow points can be much wider than is found in conventional chisel plows.

Having thus disclosed preferred embodiments of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

I claim:

1. An agricultrual implement comprising: A main frame adapted for attachment to a traction vehicle and including ground support wheels; a first set of tools carried by said main frame; first hydraulic power means for adjusting the elevation of said main frame relative to said ground support wheel; a sub-frame; a second set of tools carried by said sub-frame; adjustable linkage means including a four-bar linkage for connecting said sub-frame to said main frame to maintain said sub-frame generally parallel to said main frame; rock shaft means mounted for rotation on said main frame; second hydraulic power means operated independently of said first hydraulic power means for rotating said rock shaft and said four-bar linkage in adjusting the elevation of said sub-frame relative to said main frame; said adjustable linkage means including rigid link means interconnecting said sub-frame and said rock shaft whereby an upward force on said sub-frame will be transmitted to said rock shaft and tend to rotate the same.

2. The apparatus of claim 1 further including a second rock shaft, said first and second rock shafts mounted respectively at forward and rear positions on said main frame for rotation about respective axes transverse of the direction of travel of said implement; said adjustable linkage means comprising first and second rigid arms rigidly connected respectively to said forward and rear rock shafts and pivotally connected at their distal ends to forward and rear locations of said lift frame; and a connecting link pivotally connected at its forward and rear ends respectively to said forward and rear rock shafts for causing said rock shafts to rotate in unison when actuated by said second hydraulic power means.

3. The apparatus of claim 2 wherein said connecting link is adjustable in length.

4. The apparatus of claim 1 wherein said first and second sets of tools are ground-engaging tools, each set of tools performing a different function.

5. The apparatus of claim 4 wherein said second set of tools comprises a forward plurality of widely laterally spaced disc blades and a rear plurality of widely laterally spaced disc blades and located relative to said forward disc blades to avoid substantial overlap.

6. In an agricultural tillage apparatus adapted to be pulled by a vehicle, including a main frame adapted to carry a first set of ground working tools; wheel means coupled to said main frame for supporting and carrying said main frame; and first lift means coupled to said wheel means and main frame for raising and lowering said main frame, the improvement comprising: a sub-frame carried by said main frame at a location forward of said first set of tools; a second set of ground working tools mounted to said sub-frame, at least some tools of said second set being located forward of other tools of said second set; second lift means coupled between said main frame and said sub-frame for adjusting the height of said sub-frame relative to said main frame and including forward and rear rock shafts rotatably mounted to said main frame; power means coupled to one of said rock shafts for rotating it; first link means for connecting said rock shafts together such that they rotate together about their respective horizontal axes; forward and rear rigid link means for connecting said forward and rear rock shafts respectively to a forward and a rear part of said sub-frame, and arranged to maintain said sub-frame substantially horizontal for all settings of working depth of said second set of tools.

7. The apparatus of claim 6 further comprising means for constructing and arranging said sub-frame relative to said main frame such that the rear end of said sub-frame is normally located lower than the forward end thereof in the non-use position whereby the normal reaction forces on said second set of tools carried by said sub-frame which tend to lift the rear end of said sub-frame relative the forward end thereof will be counteracted and said sub-frame will remain substantially horizontal in the use position.

8. The apparatus of claim 6 wherein said first and second lift means are actuatable from the operator's position of said vehicle while said vehicle is in motion.

9. The apparatus of claim 6 wherein said first and second rock shafts are mounted such that the axis of rotation of said rear shaft is slightly lower than the axis of rotation of said forward shaft to compensate for operating forces on said second set of tools during tillage to maintain the same operating depths for both forward and rear tools of said second set.

10. The apparatus of claim 6 wherein said first link comprises turnbuckle means connected between said crank arms for minor adjustments of rear blades relative to front blades.

* * * * *